Figure 2:
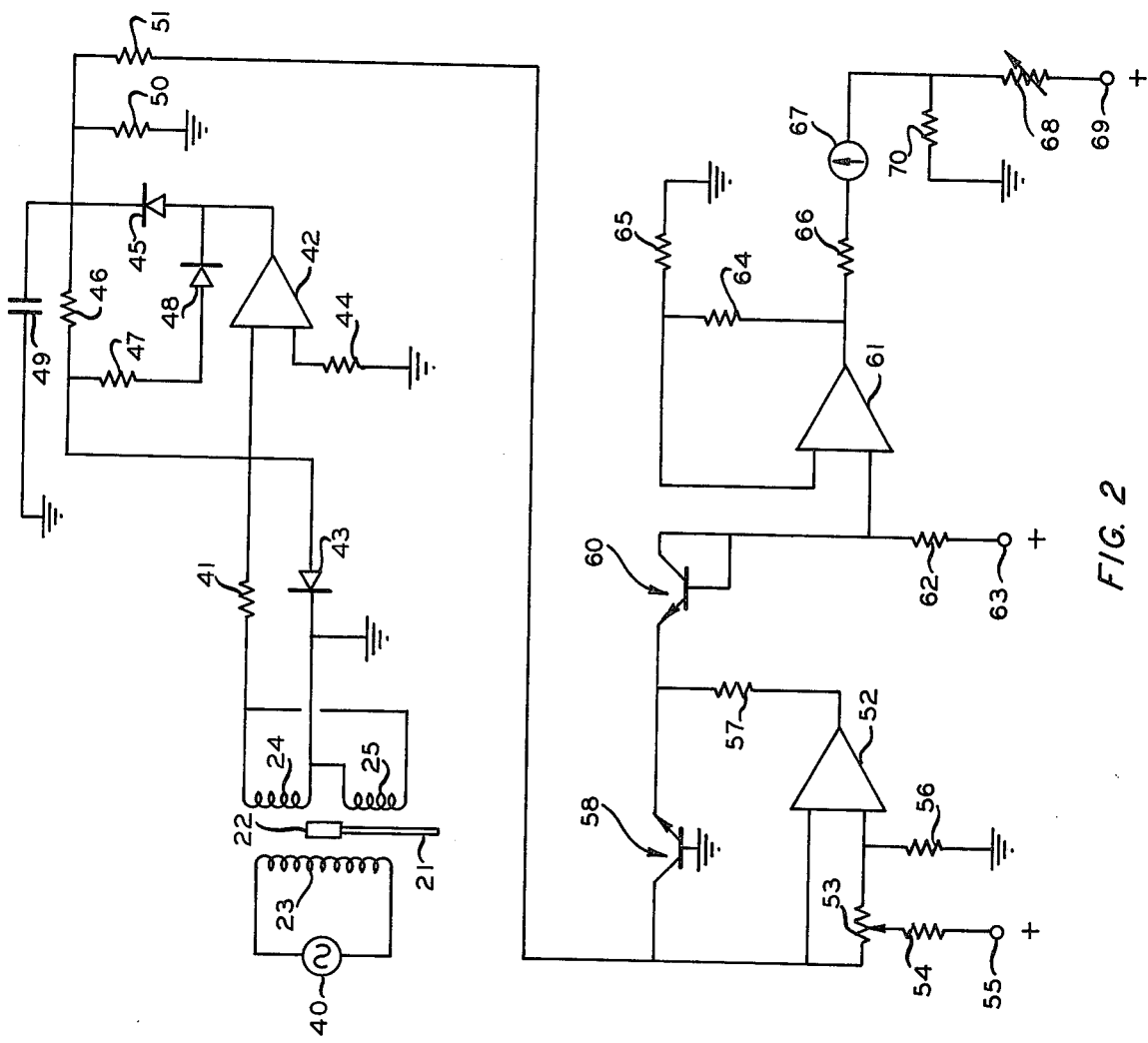

United States Patent [19]
Souder

[11] 3,881,345
[45] May 6, 1975

[54] POSITION MEASURING APPARATUS
[75] Inventor: Wallace W. Souder, Bartlesville, Okla.
[73] Assignee: Phillips Petroleum Company, Bartlesville, Okla.
[22] Filed: Feb. 22, 1974
[21] Appl. No.: 444,868

[52] U.S. Cl. .................................. 73/94; 33/DIG. 5
[51] Int. Cl. .............................................. G01n 3/10
[58] Field of Search ........ 336/130, 136; 73/94, 153, 73/149, 38; 33/DIG. 5

[56] References Cited
UNITED STATES PATENTS
2,507,344  5/1950  MacGeorge ..................... 33/DIG. 5
3,368,393  2/1968  Wilson et al. ........................... 73/94
3,839,899  10/1974  McMillen ............................... 73/38

Primary Examiner—Jerry W. Myracle

[57] ABSTRACT

A porous element, such as a core removed from a well, is subjected to hydraulic pressure in order to determine the compressibility of the element. The determination is made by measuring the change in volume of a confined body of hydraulic fluid surrounding the porous element. A movable piston carries a plug of metal which is positioned adjacent a movable differential transformer. The transformer is moved until the plug is centered, as determined by a measuring circuit comprising a rectifier, a nonlinear amplifier having a logarithmic response, and a detecting circuit.

7 Claims, 2 Drawing Figures

POSITION MEASURING APPARATUS

In oil and gas operations it is often desirable to measure the compressibility of cores removed from wells. This can be accomplished by positioning the core within a confined body of hydraulic fluid and applying a substantial external pressure to the fluid. A measurement of the reduced volume of the confined fluid thus provides an indication of the compressibility of the core.

In accordance with an embodiment of this invention, a measurement of the change in volume of such a fluid is made by measuring the displacement of a piston which separates the surface of the fluid from an external pressure source. The piston carries a plug of magnetic material which extends to a region adjacent a differential transformer that has a primary winding and first and secondary windings. The secondary windings are connected in opposition, and the primary winding is excited by a source of alternating current. The transformer is moved until the plug is centered with respect to the two secondary windings, at which time the output signal from the secondary windings is a minimum. A measurement of the physical displacement of the transformer required to obtain this condition thus provides a measurement of the movement of the surface of the hydraulic fluid surrounding the core. The measuring circuit connected to the secondary windings of the transformer includes a rectifier, an amplifier having a nonliner response, such as a logarithmic response, and a detector. The response of the amplifier is such that the gain of the detecting circuit is a maximum as the signal being detected approaches a minimum value. This provides high sensitivity for the measuring instrument.

Figure 1:
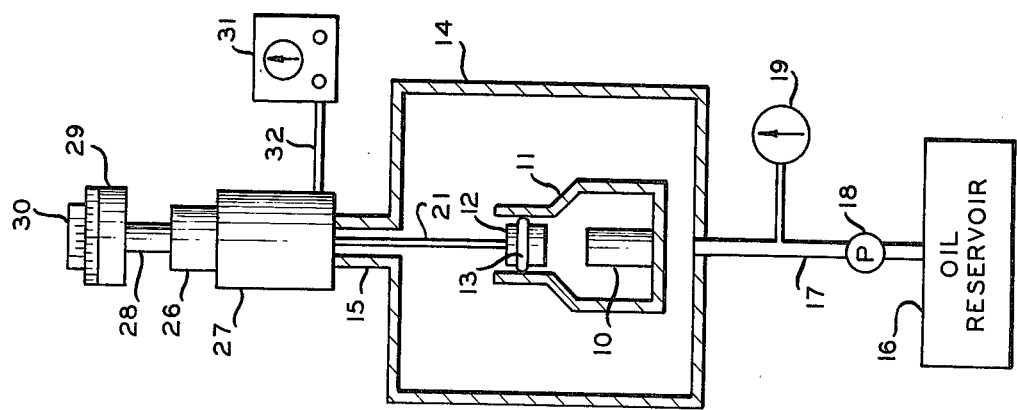

In the accompanying drawing, FIG. 1 is a schematic representation of apparatus employed to measure the compressibility of a test element. FIG. 2 is a schematic circuit drawing of an embodiment of the measuring circuit of this invention.

Referring now to the drawing in detail and to FIG. 1 in particular, there is shown a test element 10 positioned within a first housing 11. This test element can be a core removed from a well, for example. The interior of housing 11 is filled with a hydraulic fluid. A movable piston 12 is located in the top opening of the housing, and is sealed to the housing wall by a suitable ring 13. Housing 11 is positioned within an outer housing 14 which also contains a hydraulic fluid. The top of housing 14 is provided with a neck 15.

Housing 14 is connected to an oil reservoir 16 by a conduit 17 which has a hydraulic pump 18 therein. A pressure gauge 19 is connected to conduit 17. In operation, pump 18 is actuated to increase the pressure within housing 14 to a value which can be of the order of 10,000 pounds per square inch, for example. The application of pressure to the interior of housing 14 results in a corresponding pressure being applied by piston 12 to the fluid within housing 11. The hydraulic fluid in housing 11 serves to compress the element to some degree. At extremely high pressures, some compression of the hydraulic fluid within housing 11 also occurs.

A measurement representative of these conditions is made by observing the vertical displacement of piston 12 when the pressure is increased. To this end, a rod 21 extends from piston 12 upwardly through neck 15. As illustrated in FIG. 2, a slug 22 of magnetic material, such as soft iron, is attached to the upper end of rod 21. This slug extends into a differential transformer which is formed by a primary winding 23 and secondary windings 24 and 25. These three transformer windings can be wrapped on a hollow mandrel 26 which is free to move vertically on neck 15. The mandrel and neck are formed of nonmagnetic material, such as a plastic and brass, respectively. A stationary housing 27 can be attached to neck 15 to enclose the transformer windings. The lower end of a hollow rod 28 can be threaded to the upper end of neck 15 so that rotation of rod 28 by an attached hollow knob 29 results in rod 28 being moved vertically up or down. This in turn moves mandrel 26, which can be carried by rod 28, vertically up or down, so that the three windings of the differential transformer can also be moved vertically up or down. Knob 29 is provided with a micrometer scale which cooperates with a stationary marking knob 30 to provide a visual indication of the vertical displacement of the transformer. Knob 30 can be secured to neck 15 by a rod, not shown, which extends through knob 29 and rod 28. However, other types of structure can be employed to permit movement of the transformer relative to slug 22.

The electrical components of the measuring apparatus are positioned in a housing 31 and connected to the transformer by a cable 32.

As illustrated in FIG. 2, a source of alternating current 40 is connected across the primary winding 23 of the differential transformer. The two secondary windings of the transformer are connected in opposition to one another. The first end terminal of transformer winding 24 is connected by a resistor 41 to the first input of an operational amplifier 42. Aa rectifier 43 is connected between this first input terminal and the second grounded end terminal of transformer winding 24. A resistor 44 is connected between the second input of amplifier 42 and ground. A rectifier 44 is connected between the second input of amplifier 42 and ground. A rectifier 45 and a resistor 46 are connected in series between the output and the first input of amplifier 42. A resistor 47 and a rectifier 48 are connected in series between the first input and the output of amplifier 42. The junction between rectifier 45 and resistor 46 is connected to ground by a capacitor 49 and by a resistor 50.

The circuit elements associated with amplifier 42 form a rectifier circuit which converts any output AC signal from the differential transformer into a corresponding DC signal.

The junction between rectifier 45 and resistor 46 is connected by a resistor 51 to the first input of a second operational amplifier 52. A potentiometer 53 is connected between the first and second inputs of amplifier 52. The contactor of potentiometer 53 is connected by a resistor 54 to a terminal 55 which is maintained at a positive potential. The second imput of amplifier 52 is connected by a resistor 56 to ground. The output of amplifier 52 is connected by a resistor 57 to the emitter of a transistor 58. The collector of transistor 58 is connected to the first input of amplifier 52, and the base of transistor 58 is connected to ground. The emitter of transistor 58 is connected to the emitter of a second transistor 60. The collector and base of transistor 60 are connected to the second input of a third operational amplifier 61.

The circuit elements associated with amplifier 52 result in the amplifier having a nonlinear response which is substantially logarithmic. This results in the gain of the amplifier being a maximum when the input signal to the amplifier approaches zero. As such, maximum sensitivity is obtained when the transformer approaches a balanced condition with respect to the location of slug 22.

The second input of amplifier 61 is connected by a resistor 62 to a terminal 63 which is maintained at a positive potential. A resistor 64 is connected between the output and the first input of amplifier 61. A resistor 65 is connected between the first input of amplifier 61 and ground. The output of amplifier 61 is connected by a resistor 66 to the first terminal of a current meter 67. The second terminal of meter 67 is connected by a variable resistor 68 to a terminal 69 which is maintained at a positive potential and by a resistor 70 to ground.

Amplifier 61 serves to amplify the output signal of amplifier 52 to a sufficient level to be detected by meter 67. Potentiometer 53 provides a sensitivity adjustment in the measuring circuit, and variable resistor 68 provides a zero adjustment for meter 67.

In the operation of the measuring apparatus, the transformer is moved vertically until slug 22 is centered. This position is observed by a minimum reading on meter 67. If the circuit is exactly balanced, meter 67 should read zero. Because of the rectifier circuit, there is a positive displacement of the meter whenever slug 22 is displaced from the center point of the transformer, regardless of the direction of displacement. By observing the distance the transformer is moved vertically between balance points at any given set of pressures, it is possible to determine the amount of hydraulic fluid which has served to compress the test element 10.

Although the apparatus of this invention is particularly useful in measuring fluid displacements, as described, it can also be employed to advantage to measure movement of other types of devices. The instrument provides maximum sensitivity when a balanced condition is being approached. This permits use of a meter with only a single scale because the sensitivity is reduced as the slug moves farther away from the balanced condition.

While this invention has been described in conjunction with a presently preferred embodiment, it should be evident that it is not limited thereto.

What is claimed is:

1. Apparatus adapted to be used to measure movement of an element comprising:
   a differential transformer having a primary coil, which is adapted to have a source of alternating current connected thereto, and two secondary coils spaced from one another;
   a slug of a magentic material which is adapted to be connected to the element to be measured and to be moved relative to and adjacent said secondary coils;
   means connecting said secondary coils in electrical opposition to one another; and
   a measuring circuit connected to said secondary coils, said measuring circuit including rectifying means to establish a DC output signal representative of an AC signal established across said secondary coils, amplifying means connected to said rectifying means, said amplifying means having a nonlinear response to a DC input signal such that the gain of the amplifying means increases when the input signal decreases, and a meter connected to said amplifying means.

2. The apparatus of cliam 1 wherein said amplifying means comprises an amplifier haivng a logarithmic response.

3. The apparatus of claim 2 wherein said amplifier comprises an operational amplifier having a transistor connected in a feedback network between the output and the input of the amplifier, said transistor comprising an emitter, a collector and a base, the collector being connected to said input, the emitter being connected to said output and the base being connected to a point of reference potential.

4. The apparatus of claim 1, further comprising a scale positioned so as to permit the location of said transformer to be measured when said slug is symmetrically positioned to said secondary coils.

5. In a system adapted to measure the compressibility of a test element in which the test element is positioned in a housing containing a hydraulic fluid, a movable piston is located in an opening of the housing, and pressure is exerted on the piston from an external source to exert a corresponding pressure on the hydraulic fluid in the housing; apparatus to measure movement of the piston comprising:
   a movable differential transformer spaced from said piston, said transformer including a primary coil, which is adapted to have a source of alternating current connected thereto, and two secondary coils spaced from one another;
   a slug of magnetic material;
   means connecting said slug to said piston so that movement of said piston results in movement of said slug relative to and adjacent said secondary coils;
   means connecting said secondary coils in electrical opposition to one another; and
   a measuring circuit connected to said secondary coils, said measuring circuit including rectifying means to establish a DC output signal representative of an AC signal established across said secondary coils, amplifying means connected to said rectifying means, said amplifying means having a nonlinear response to a DC input signal such that the gain of the amplifying means increases when the input signal decreases, and a meter connected to said amplifying means.

6. The apparatus of claim 5 wherein said amplifying means comprises an amplifier having a logarithmic response.

7. The apparatus of claim 5, further comprising a scale positioned so as to permit the location of said transformer to be measured when said slug is symmetrically positioned relative to said secondary coils.

* * * * *